(12) United States Patent
Jensen et al.

(10) Patent No.: US 6,177,381 B1
(45) Date of Patent: Jan. 23, 2001

(54) LAYERED CATALYST COMPOSITION AND PROCESSES FOR PREPARING AND USING THE COMPOSITION

(75) Inventors: Robert H Jensen, Hinsdale; Jeffrey C. Bricker, Buffalo Grove; Qianjun Chen, Des Plaines, all of IL (US); Masaru Tatsushima, Isehara (JP); Kenji Kikuchi, Kanagawa-ken (JP); Masao Takayama, Isehara (JP); Koji Hara, Kanagawa-ken (JP); Isao Tsunokuma, Kanagawa-ken (JP); Hiroyuki Serizawa, Kanagawa-ken (JP)

(73) Assignee: UOP LLC, Des Plaines, IL (US)

( * ) Notice: Under 35 U.S.C. 154(b), the term of this patent shall be extended for 0 days.

(21) Appl. No.: 09/185,189

(22) Filed: Nov. 3, 1998

(51) Int. Cl.[7] ............................ B01J 23/00; B01J 27/06; B01J 27/138; B32B 15/02; B32B 17/02

(52) U.S. Cl. ........................ 502/325; 502/224; 502/226; 502/227; 502/230; 502/231; 502/304; 502/328; 502/329; 502/330; 502/332; 502/334; 502/339; 502/349; 502/351; 502/352; 502/353; 502/354; 428/403; 428/404; 428/701; 428/702

(58) Field of Search ............................ 502/325, 328, 502/329, 334, 330, 332, 339, 304, 349, 351–354, 224, 226, 227, 230, 231; 428/403, 404, 701, 702

(56) References Cited

U.S. PATENT DOCUMENTS

| | | | |
|---|---|---|---|
| 2,620,314 | 12/1952 | Hoekstra ............................... | 252/448 |
| 3,145,183 | 8/1964 | Fisher .................................. | 252/477 |
| 3,274,124 | 9/1966 | O'Hara ................................. | 252/451 |
| 3,557,477 | 1/1971 | Kluksdahl ............................ | 208/138 |
| 3,562,147 | 2/1971 | Pollitzer et al. .................... | 208/139 |
| 3,584,060 | 6/1971 | Rausch ................................ | 260/669 |
| 3,632,503 | 1/1972 | Hayes ................................. | 208/139 |
| 3,649,566 | 3/1972 | Hayes et al. ........................ | 252/470 |
| 3,682,838 | 8/1972 | Bloch ................................. | 252/464 |
| 3,755,481 | 8/1973 | Hayes ................................. | 260/668 |
| 3,761,531 | 9/1973 | Bloch ................................. | 260/668 |
| 3,878,131 | 4/1975 | Hayes ................................. | 252/466 |
| 3,897,368 | 7/1975 | Ohara et al. ........................ | 252/466 |
| 3,909,450 | 9/1975 | O'Hara .............................. | 252/438 |
| 3,951,860 | * 4/1976 | Acres et al. ..................... | 502/527.12 |
| 4,077,912 | 3/1978 | Dolhyj et al. ..................... | 252/461 |
| 4,255,253 | 3/1981 | Herrington et al. ................ | 208/216 |
| 4,440,871 | 4/1984 | Lok et al. ........................... | 502/214 |
| 4,483,940 | * 11/1984 | Ono et al. ......................... | 502/159 |
| 4,567,029 | 1/1986 | Wilson et al. ...................... | 423/306 |
| 4,686,202 | * 8/1987 | Broecker ............................. | 502/300 |
| 4,701,436 | * 10/1987 | Wang et al. ....................... | 502/339 |
| 4,716,143 | 12/1987 | Imai .................................. | 502/326 |
| 4,786,625 | 11/1988 | Imai et al. .......................... | 502/326 |
| 4,793,984 | 12/1988 | Lok et al. ........................... | 423/306 |
| 4,868,148 | * 9/1989 | Henk et al. ......................... | 502/302 |
| 4,988,659 | 1/1991 | Pecoraro ............................ | 502/235 |
| 5,164,350 | * 11/1992 | Abe et al. ........................... | 502/66 |
| 5,179,054 | * 1/1993 | Schipper et al. ................... | 502/67 |
| 5,286,699 | * 2/1994 | Ohata et al. ....................... | 502/304 |
| 5,407,880 | * 4/1995 | Ikeda et al. ........................ | 502/67 |
| 5,504,051 | * 4/1996 | Nakamura et al. ................. | 502/261 |
| 5,516,740 | * 5/1996 | Cody et al. ........................ | 502/204 |
| 5,763,351 | * 6/1998 | Ichimura ............................ | 502/303 |
| 5,811,064 | * 9/1998 | Kojima et al. .................. | 502/527.15 |
| 6,022,825 | * 2/2000 | Andersen et al. ................. | 502/303 |

FOREIGN PATENT DOCUMENTS

WO98/14274    4/1998    (WO) .

* cited by examiner

Primary Examiner—Mark L. Bell
Assistant Examiner—Patricia L. Hailey
(74) Attorney, Agent, or Firm—John G. Tolomei; Frank S. Molinaro

(57) ABSTRACT

This invention relates to a layered catalyst composition, a process for preparing the composition and processes for using the composition. The catalyst composition comprises an inner core such as alpha-alumina, and an outer layer bonded to the inner core composed of an outer refractory inorganic oxide such as gamma-alumina. The outer layer has uniformly dispersed thereon a platinum group metal such as platinum and a promoter metal such as tin. The composition also contains a modifier metal such as lithium. The catalyst composition shows improved durability and selectivity for dehydrogenating hydrocarbons.

33 Claims, No Drawings

Title: LAYERED CATALYST COMPOSITION AND PROCESSES FOR PREPARING AND USING THE COMPOSITION

FIELD OF THE INVENTION

This invention relates to a layered catalyst composition, a process for preparing the composition and hydrocarbon conversion processes using the composition. The layered composition comprises an inner core such as alpha alumina, and an outer layer, comprising an outer refractory inorganic oxide, bonded to the inner core. The outer layer has uniformly dispersed thereon at least one platinum group metal, and a promoter metal. The catalyst composition further contains a modifier metal.

BACKGROUND OF THE INVENTION

Platinum based catalysts are used for numerous hydrocarbon conversion processes. In many applications promoters and modifiers are also used. One such hydrocarbon conversion process is the dehydrogenation of hydrocarbons, particularly alkanes such as isobutane which are converted to isobutylene. For example, U.S. Pat. No. 3,878,131 (and related U.S. Pat. Nos. 3,632,503 and 3,755,481) discloses a catalyst comprising a platinum metal, a tin oxide component and a germanium oxide component. All components are uniformly dispersed throughout the alumina support. U.S. Pat. No. 3,761,531 (and related U.S. Pat. No. 3,682,838) discloses a catalytic composite comprising a platinum group component, a Group IVA metallic component, e.g., germanium, a Group VA metallic component, e.g., arsenic, antimony and an alkali or alkaline earth component all dispersed on an alumina carrier material. Again all the components are evenly distributed on the carrier.

U.S. Pat. Nos. 3,558,477, 3,562,147, 3,584,060 and 3,649,566 all disclose catalytic composites comprising a platinum group component and a rhenium component on a refractory oxide support. However, as before, these references disclose that the best results are achieved when the platinum group component and rhenium component are uniformly distributed throughout the catalyst.

It is also known that for certain processes selectivity towards desirable products is inhibited by excessive residence time of the feed or the products at the active sites of the catalyst. Thus, U.S. Pat. No. 4,716,143 describes a catalyst in which the platinum group metal is deposited in an outer layer (about 400 $\mu$m) of the support. No preference is given to how the modifier metal should be distributed throughout the support. Similarly U.S. Pat. No. 4,786,625 discloses a catalyst in which the platinum is deposited on the surface of the support whereas the modifier metal is evenly distributed throughout the support.

U.S. Pat. No. 3,897,368 describes a method for the production of a noble metal catalyst where the noble metal is platinum and the platinum is deposited selectively upon the external surface of the catalyst. However, this disclosure describes the advantages of impregnating only platinum on the exterior layer and utilizes a specific type of surfactant to achieve the surface impregnation of the noble metal.

The art also discloses several references where a catalyst contains an inner core and an outer layer or shell. For example, U.S. Pat. No. 3,145,183 discloses spheres having an impervious center and a porous shell. Although it is disclosed that the impervious center can be small, the overall diameter is 1/8" or larger. It is stated that for smaller diameter spheres (less than 1/8"), uniformity is hard to control. U.S. Pat. No. 5,516,740 discloses a thin outer shell of catalytic material bonded to an inner core of catalytically inert material. The outer core can have catalytic metals such as platinum dispersed on it. The '740 patent further discloses that this catalyst is used in an isomerization process. Finally, the outer layer material contains the catalytic metal prior to it being coated onto the inner core.

U.S. Pat. Nos. 4,077,912 and 4,255,253 disclose a catalyst having a base support having deposited thereon a layer of a catalytic metal oxide or a combination of a catalytic metal oxide and an oxide support. WO98/14274 discloses a catalyst which comprises a catalytically inert core material on which is deposited and bonded a thin shell of material containing active sites.

Applicants have developed a layered catalyst composition which differs from the prior art in several ways. The composition comprises an inner core such as alpha alumina and an outer layer such as gamma alumina. The outer layer has uniformly distributed thereon at least one platinum group metal such as platinum and a modifier metal such as tin. The platinum group metal to modifier metal atomic ratio varies from about 0.1 to about 5. The outer layer has a thickness of about 40 to about 400 microns. A modifier metal, e.g., lithium, is also present on the catalyst composition and may be present either entirely in the layer or distributed throughout the catalyst composition. Finally, the composition is prepared using an organic bonding agent such as polyvinyl alcohol which increases the bond between the layer and the inner core thereby reducing loss of the layer by attrition.

SUMMARY OF THE INVENTION

The present invention relates to a layered catalyst composition, a process for preparing the composition and hydrocarbon conversion processes using the composition. One embodiment of the invention is a hydrocarbon conversion process comprising contacting a hydrocarbon fraction with a layered composition under hydrocarbon conversion conditions to give a converted product, the layered composition comprising an inner core, an outer layer bonded to said inner core to the extent that the attrition loss is less than 10 wt. % based on the weight of the outer layer and, the outer layer comprising an outer refractory inorganic oxide having uniformly dispersed thereon at least one platinum group metal and at least one promoter metal, the catalyst composition further having dispersed thereon at least one modifier metal.

Another embodiment of the invention is a process for preparing the layered catalyst composition described above, the process comprising:

a) coating an inner core with a slurry comprising the outer refractory inorganic oxide and an organic bonding agent, said outer oxide having uniformly dispersed thereon at least one promoter metal, drying the coated core and calcining at a temperature of about 400° C. to about 900° C. for a time sufficient to bond the outer layer to the inner core and provide a layered support; and b) uniformly dispersing on the layered support of step (a) a modifier metal and a platinum group metal to give a product; and c) reducing the product of step (b) at reduction conditions to provide said layered catalyst composition.

A further embodiment of the invention is a process for preparing a layered catalyst composition comprising an inner core, an outer layer bonded to said inner core, the outer layer bonded to the inner core to the extent that the attrition loss is less than 10 wt. % based on the weight of the outer layer and the outer layer comprising an outer refractory inorganic oxide, having uniformly dispersed thereon at least one platinum group metal and at least one promoter metal, the catalyst composition further having dispersed thereon at least one modifier metal; the process comprising uniformly dispersing on the outer refractory oxide at least one modifier metal, at least one platinum group metal and at least one promoter metal, and coating an inner core with a slurry comprising the outer refractory oxide containing said platinum group metal, promoter metal, modifier metal and an organic bonding agent, drying and then calcining the coated core at a temperature of about 400° C. to about 900° C. for a time sufficient to provide a layered catalyst composition.

A still further embodiment is a layered catalyst composition comprising an inner core, an outer layer bonded to said inner core, the outer layer comprising an outer refractory inorganic oxide having uniformly dispersed thereon at least one platinum group metal, a promoter metal and the catalyst composition further having dispersed thereon a modifier metal and where the inner core is selected from the group consisting of alpha alumina, theta alumina, silicon carbide, metals, cordierite, zirconia, titania and mixtures thereof.

These and other objects and embodiments will become more clear after a detailed description of the invention.

DETAILED DESCRIPTION OF THE INVENTION

As stated, the present invention relates to a layered catalyst composition, a process for preparing the composition and hydrocarbon conversion processes using the layered composition. The layered catalyst composition comprises an inner core composed of a material which has substantially lower adsorptive capacity for catalytic metal precursors, relative to the outer layer. Some of the inner core materials are also not substantially penetrated by liquids, e.g., metals. Examples of the inner core material include, but are not limited to, refractory inorganic oxides, silicon carbide and metals. Examples of refractory inorganic oxides include without limitation alpha alumina, theta alumina, cordierite, zirconia, titania and mixtures thereof. A preferred inorganic oxide is alpha alumina.

These materials which form the inner core can be formed into a variety of shapes such as pellets, extrudates, spheres or irregularly shaped particles although not all materials can be formed into each shape. Preparation of the inner core can be done by means known in the art such as oil dropping, pressure molding, metal forming, pelletizing, granulation, extrusion, rolling methods and marumerizing. A spherical inner core is preferred. The inner core whether spherical or not has an effective diameter of about 0.05 mm to about 5 mm and preferably from about 0.8 mm to about 3 mm. For a non-spherical inner core, effective diameter is defined as the diameter the shaped article would have if it were molded into a sphere. Once the inner core is prepared, it is calcined at a temperature of about 400° C. to about 1500° C.

The inner core is now coated with a layer of a refractory inorganic oxide which is different from the inorganic oxide which may be used as the inner core and will be referred to as the outer refractory inorganic oxide. This outer refractory oxide is one which has good porosity, has a surface area of at least 20 $m^2/g$, and preferably at least 50 $m^2/g$, an apparent bulk density of about 0.2 g/ml to about 1.0 g/ml and is chosen from the group consisting of gamma alumina, delta alumina, eta alumina, theta alumina, silica/alumina, zeolites, non-zeolitic molecular sieves (NZMS), titania, zirconia and mixtures thereof. It should be pointed out that silica/alumina is not a physical mixture of silica and alumina but means an acidic and amorphous material that has been cogelled or coprecipitated. This term is well known in the art, see e.g., U.S. Pat. Nos. 3,909,450; 3,274,124 and 4,988,659, all of which are incorporated by reference. Examples of zeolites include, but are not limited to, zeolite Y, zeolite X, zeolite L, zeolite beta, ferrierite, MFI, mordenite and erionite. Non-zeolitic molecular sieves (NZMS) are those molecular sieves which contain elements other than aluminum and silicon and include silicoaluminophosphates (SAPOs) described in U.S. Pat. No. 4,440,871, ELAPOs described in U.S. Pat. No. 4,793,984, MeAPOs described in U.S. Pat. No. 4,567,029 all of which are incorporated by reference. Preferred refractory inorganic oxides are gamma and eta alumina.

A preferred way of preparing a gamma alumina is by the well-known oil drop method which is described in U.S. Pat. No. 2,620,314 which is incorporated by reference. The oil drop method comprises forming an aluminum hydrosol by any of the techniques taught in the art and preferably by reacting aluminum metal with hydrochloric acid; combining the hydrosol with a suitable gelling agent, e.g., hexamethylenetetraamine; and dropping the resultant mixture into an oil bath maintained at elevated temperatures (about 93° C.). The droplets of the mixture remain in the oil bath until they set and form hydrogel spheres. The spheres are then continuously withdrawn from the oil bath and typically subjected to specific aging and drying treatments in oil and ammoniacal solutions to further improve their physical characteristics. The resulting aged and gelled spheres are then washed and dried at a relatively low temperature of about 80° C. to 260° C. and then calcined at a temperature of about 455° to 705° C. for a period of about 1 to about 20 hours. This treatment effects conversion of the hydrogel to the corresponding crystalline gamma alumina.

The layer is applied by forming a slurry of the outer refractory oxide and then coating the inner core with the slurry by means well known in the art. Slurries of inorganic oxides can be prepared by means well known in the art which usually involve the use of a peptizing agent. For example, any of the transitional aluminas can be mixed with water and an acid such as nitric, hydrochloric, or sulfuric to give a slurry. Alternatively, an aluminum sol can be made by for example, dissolving aluminum metal in hydrochloric acid and then mixing the aluminum sol with the alumina powder.

It is also required that the slurry contain an organic bonding agent which aids in the adhesion of the layer material to the inner core. Examples of this organic bonding agent include but are not limited to polyvinyl alcohol (PVA), hydroxy propyl cellulose, methyl cellulose and carboxy methyl cellulose. The amount of organic bonding agent which is added to the slurry will vary considerably from about 0.1 wt. % to about 3 wt. % of the slurry. How strongly the outer layer is bonded to the inner core can be measured by the amount of layer material lost during an attrition test, i.e., attrition loss. Loss of the second refractory oxide by attrition is measured by agitating the catalyst, collecting the fines and calculating an attrition loss. It has been found that by using an organic bonding agent as described above, the attrition loss is less than about 10 wt. % of the outer layer. Finally, the thickness of the outer layer varies from about 40 to about 400 microns, preferably from about 40 microns to about 300 microns and more preferably from about 45 microns to about 200 microns.

Depending on the particle size of the outer refractory inorganic oxide, it may be necessary to mill the slurry in order to reduce the particle size and simultaneously give a narrower particle size distribution. This can be done by means known in the art such as ball milling for times of about 30 minutes to about 5 hours and preferably from about 1.5 to about 3 hours. It has been found that using a slurry with a narrow particle size distribution improves the bonding of the outer layer to the inner core.

Without wishing to be bound by any particular theory, it appears that bonding agents such as PVA aid in making an interlocking bond between the outer layer material and the inner core. Whether this occurs by the PVA reducing the surface tension of the core or by some other mechanism is not clear. What is clear is that a considerable reduction in loss of the outer layer by attrition is observed (See examples 8 and 9).

The slurry may also contain an inorganic bonding agent selected from an alumina bonding agent, a silica bonding agent or mixtures thereof. Examples of silica bonding agents include silica sol and silica gel, while examples of alumina bonding agents include alumina sol, boehmite and aluminum nitrate. The inorganic bonding agents are converted to alumina or silica in the finished composition. The amount of inorganic bonding agent varies from about 2 to about 15 wt. % as the oxide, and based on the weight of the slurry.

Coating of the inner core with the slurry can be accomplished by means such as rolling, dipping, spraying, etc. One preferred technique involves using a fixed fluidized bed of inner core particles and spraying the slurry into the bed to coat the particles evenly. The thickness of the layer can vary considerably, but usually is from about 40 to about 400 microns preferably from about 40 to about 300 microns and most preferably from about 50 microns to about 200 microns. It should be pointed out that the optimum layer thickness depends on the use for the catalyst and the choice of the outer refractory oxide. Once the inner core is coated with the layer of outer refractory inorganic oxide, the resultant layered support is dried at a temperature of about 100° C. to about 320° C. for a time of about 1 to about 24 hours and then calcined at a temperature of about 400° C. to about 900° C. for a time of about 0.5 to about 10 hours to effectively bond the outer layer to the inner core and provide a layered catalyst support. Of course, the drying and calcining steps can be combined into one step.

When the inner core is composed of a refractory inorganic oxide (inner refractory oxide), it is necessary that the outer refractory inorganic oxide be different from the inner refractory oxide. Additionally, it is required that the inner refractory inorganic oxide have a substantially lower adsorptive capacity for catalytic metal precursors relative to the outer refractory inorganic oxide.

Having obtained the layered catalyst support, catalytic metals can be dispersed on the layered support by means known in the art. Thus, a platinum group metal, a promoter metal and a modifier metal can be dispersed on the outer layer. The platinum group metals include platinum, palladium, rhodium, iridium, ruthenium and osmium. Promoter metals are selected from the group consisting of tin, germanium, rhenium, gallium, bismuth, lead, indium, cerium, zinc and mixtures thereof, while modifier metals are selected from the group consisting of alkali metals, alkaline earth metals and mixtures thereof.

These catalytic metal components can be deposited on the layered support in any suitable manner known in the art. One method involves impregnating the layered support with a solution (preferably aqueous) of a decomposable compound of the metal or metals. By decomposable is meant that upon heating the metal compound is converted to the metal or metal oxide with the release of byproducts. Illustrative of the decomposable compounds of the platinum group metals are chloroplatinic acid, ammonium chloroplatinate, bromoplatinic acid, dinitrodiamino platinum, sodium tetranitroplatinate, rhodium trichloride, hexa-amminerhodium chloride, rhodium carbonylchloride, sodium hexanitrorhodate, chloropalladic acid, palladium chloride, palladium nitrate, diamminepalladium hydroxide, tetraamminepalladium chloride, hexachloroiridate (IV) acid, hexachloroiridate (Ill) acid, ammonium hexachloroiridate (III), ammonium aquohexachloroiridate (IV), ruthenium tetrachloride, hexachlororuthenate, hexa-ammineruthenium chloride, osmium trichloride and ammonium osmium chloride. Illustrative of the decomposable promoter metal compounds are the halide salts of the promoter metals. A preferred promoter is tin and preferred decomposable compounds are stannous chloride or stannic chloride.

The alkali and alkaline earth metals which can be used as modifier metals in the practice of this invention include lithium, sodium, potassium, cesium, rubidium, beryllium, magnesium, calcium, strontium and barium. Preferred modifier metals are lithium, potassium, sodium and cesium with lithium and sodium being especially preferred. Illustrative of the decomposable compounds of the alkali and alkaline earth metals are the halide, nitrate, carbonate or hydroxide compounds, e.g., potassium hydroxide, lithium nitrate.

All three types of metals can be impregnated using one common solution or they can be sequentially impregnated in any order, but not necessarily with equivalent results. A preferred impregnation procedure involves the use of a steam-jacketed rotary dryer. The support is immersed in the impregnating solution containing the desired metal compound contained in the dryer and the support is tumbled therein by the rotating motion of the dryer. Evaporation of the solution in contact with the tumbling support is expedited by applying steam to the dryer jacket. The resultant composite is allowed to dry under ambient temperature conditions, or dried at a temperature of about 80° to about 110° C., followed by calcination at a temperature of about 200° C. to about 700° C. for a time of about 1 to about 4 hours, thereby converting the metal compound to the metal or metal oxide. It should be pointed out that for the platinum group metal compound, it is preferred to carry out the calcination at a temperature of about 400° C. to about 700° C.

In one method of preparation, the promoter metal is first deposited onto the layered support and calcined as described above and then the modifier metal and platinum group metal are simultaneously dispersed onto the layered support by using an aqueous solution which contains a compound of the modifier metal and a compound of the platinum group metal. The support is impregnated with the solution as described above and then calcined at a temperature of about 400° C. to about 700° C. for a time of about 1 to about 4 hours.

An alternative method of preparation involves adding one or more of the metal components to the outer refractory oxide prior to applying it as a layer onto the inner core. For example, a decomposable salt of the promoter metal, e.g., tin (IV) chloride can be added to a slurry composed of gamma alumina and aluminum sol. Further, either the modifier metal or the platinum group metal or both can be added to the slurry. Thus, in one method, all three catalytic metals are deposited onto the outer refractory oxide prior to depositing the second refractory oxide as a layer onto the inner core. Again, the three types of catalytic metals can be deposited onto the outer refractory oxide powder in any order although not necessarily with equivalent results.

One preferred method of preparation involves first impregnating the promoter metal onto the outer refractory oxide and calcining as described above. Next, a slurry is prepared (as described above) using the outer refractory oxide containing the promoter metal and applied to the inner core by means described above. Finally, the modifier metal and platinum group metal are simultaneously impregnated onto the layered composition which contains the promoter metal and calcined as described above to give the desired layered catalyst. This method of preparation is preferred when the catalyst is used in a dehydrogenation process. Other methods, as described above, may be preferred when the catalyst is to be used for other processes.

As a final step in the preparation of the layered catalyst composition, the catalyst composition is reduced under hydrogen or other reducing atmosphere in order to ensure that the platinum group metal component is in the metallic state (zero valent). Reduction is carried out at a temperature of about 100° C. to about 650° C. for a time of about 0.5 to about 10 hours in a reducing environment, preferably dry hydrogen. The state of the promoter and modifier metals can be metallic (zero valent), metal oxide or metal oxychloride.

The layered catalyst composition can also contain a halogen component which can be fluorine, chlorine, bromine, iodine or mixtures thereof with chlorine and bromine preferred. This halogen component is present in an amount of 0.03 to about 1.5 wt. % with respect to the weight of the entire catalyst composition. The halogen component can be applied by means well known in the art and can be done at any point during the preparation of the catalyst composition although not necessarily with equivalent results. It is preferred to add the halogen component after all the catalytic components have been added either before or after treatment with hydrogen.

Although in the preferred embodiments all three metals are uniformly distributed throughout the outer layer of outer refractory oxide and substantially present only in the outer layer, it is also within the bounds of this invention that the modifier metal can be present both in the outer layer and the inner core. This is owing to the fact that the modifier metal can migrate to the inner core, when the core is other than a metallic core.

Although the concentration of each metal component can vary substantially, it is desirable that the platinum group metal be present in a concentration of about 0.01 to about 5 weight percent on an elemental basis of the entire weight of the catalyst and preferably from about 0.05 to about 2.0 wt. %. The promoter metal is present in an amount from about 0.05 to about 10 wt. % of the entire catalyst while the modifier metal is present in an amount from about 0.1 to about 5 wt. % and preferably from about 2 to about 4 wt. % of the entire catalyst. Finally, the atomic ratio of the platinum group metal to modifier metal varies from about 0.05 to about 5. In particular when the modifier metal is tin, the atomic ratio is from about 0.1:1 to about 5:1 and preferably from about 0.5:1 to about 3:1. When the modifier metal is germanium the ratio is from about 0.25:1 to about 5:1 and when the promoter metal is rhenium, the ratio is from about 0.05:1 to about 2.75:1.

Having obtained the layered catalyst, it can be used in a variety of hydrocarbon conversion processes, which include, but are not limited to alkylation of both aromatics and isoparaffins, hydrocracking, cracking isomerization, hydrogenation, dehydrogenation and oxidation. The conditions for carrying out these processes are well known in the art and are presented here for completeness.

The conditions necessary to carry out alkylation of aromatic compounds are well known and are disclosed, for example, in U.S. Pat. Nos. 3,965,043 and 3,979,331 which are incorporated by reference. Generally the process can be carried out in a batch type or a continuous type operation. In a batch type process, the catalyst, aromatic compound and alkylating agent are placed in an autoclave and the pressure increased, if necessary, in order to effect the reaction in the liquid phase. An excess amount of aromatic compound should be present, preferably in a range of about 2:1 to about 20:1 moles of aromatic compound per mole of alkylating agent. The reaction is carried out at an elevated temperature since the rate of alkylation is undesirably low at room temperature. Preferably the temperature is in the range of about 40° C. to about 200° C. The process is carried out for a time of about 0.5 to about 4 hours, after which the product is separated from the starting materials by conventional means.

If it is desired to carry out the process in a continuous manner, the catalyst is placed in a reactor which is heated to the desired operating temperature and the pressure increased above atmospheric, if necessary. The aromatic compound and alkylating agent are flowed over the catalyst bed at a predetermined liquid hourly space velocity sufficient to effect alkylation. The effluent is continuously withdrawn and conventional separation means used to isolate the desired product.

Hydrocracking conditions typically include a temperature in the range of 240° C. to 649° C. (400° F.–1200° F.), preferably between about 316° C. and about 510° C. (600–950° F.). Reaction pressures are in the range of atmospheric to about 24,132 kPag (3,500 psig), preferably between about 1,379 and 20,685 kPag (200–3,000 psig). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of about 178 to 8,888 standard cubic meters per cubic meter of charge (1,000 to 50,000 standard cubic feet (scf) per barrel of charge) preferably between about 355 to about 5,333 std. $m^3/m^3$ (2,000 and 30,000 scf per barrel of charge).

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the catalyst composition using feedstocks such as gas oils, heavy naphthas, deasphalted crude oil residua, etc. with gasoline being the principal desired product. Temperature conditions of about 454° C. to about 593° C. (850° to 1100° F.,) LHSV values of 0.5 to 10 $hr^{-1}$ and pressure conditions of from about 0 to about 345 kPag (50 psig) are suitable.

Isomerization reactions are carried out in a temperature range of about 371° C. to about 538° C. (700–1000° F.). Olefins are preferably isomerized at temperatures of about 260° C. to about 482° C. (500° F. to 900° F.), while paraffins, naphthenes and alkyl aromatics are isomerized at temperatures of about 371° C. to 538° C. (700° F. to 1000° F.). Hydrogen pressures are in the range of about 689 to about 3,445 kPag (100 to 500 psig). Contact times usually correspond to liquid hourly space velocities (LHSV) in the range of about 0.1 hr$^{-1}$ to 10 hr$^{-1}$. Hydrogen to hydrocarbon molar ratios in the range of 1 to 20, preferably between 4 and 12.

In a dehydrogenation process, dehydrogenatable hydrocarbons are contacted with the catalyst of the instant invention in a dehydrogenation zone maintained at dehydrogenation conditions. This contacting can be accomplished in a fixed catalyst bed system, a moving catalyst bed system, a fluidized bed system, etc., or in a batch-type operation. A fixed bed system is preferred. In this fixed bed system the hydrocarbon feed stream is preheated to the desired reaction temperature and then flowed into the dehydrogenation zone containing a fixed bed of the catalyst. The dehydrogenation zone may itself comprise one or more separate reaction zones with heating means there between to ensure that the desired reaction temperature can be maintained at the entrance to each reaction zone. The hydrocarbon may be contacted with the catalyst bed in either upward, downward or radial flow fashion. Radial flow of the hydrocarbon through the catalyst bed is preferred. The hydrocarbon may be in the liquid phase, a mixed vapor-liquid phase or the vapor phase when it contacts the catalyst. Preferably, it is in the vapor phase.

Hydrocarbons which can be dehydrogenated include hydrocarbons with 2 to 30 or more carbon atoms including paraffins, isoparaffins, alkylaromatics, naphthenes and olefins. A preferred group of hydrocarbons is the group of normal paraffins with 2 to about 30 carbon atoms. Especially preferred normal paraffins are those having 2 to 15 carbon atoms.

Dehydrogenation conditions include a temperature of from about 400° C. to about 900° C., a pressure of from about 1 to about 1013 kPa and a liquid hourly space velocity (LHSV) of from about 0.1 to about 100 hr$^{-1}$. Generally for normal paraffins the lower the molecular weight the higher the temperature required for comparable conversion. The pressure in the dehydrogenation zone is maintained as low as practicable, consistent with equipment limitations, to maximize the chemical equilibrium advantages.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent material before, while or after being flowed to the dehydrogenation zone. The diluent material may be hydrogen, steam, methane, ethane, carbon dioxide, nitrogen, argon and the like or a mixture thereof. Hydrogen is the preferred diluent. Ordinarily, when hydrogen is utilized as the diluent it is utilized in amounts sufficient to ensure a hydrogen to hydrocarbon mole ratio of about 0.1:1 to about 40:1, with best results being obtained when the mole ratio range is about 1:1 to about 10:1. The diluent hydrogen stream passed to the dehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, about 1 to about 20,000 weight ppm of the hydrocarbon feed stream. About 1 to about 10,000 weight ppm or water addition gives best results when dehydrogenating paraffins having from 2 to 30 or more carbon atoms.

Hydrogenation processes can be carried out using reactors and hydrogenation zones similar to the dehydrogenation process described above. Specifically, hydrogenation conditions include pressures of about 0 kPag to about 13,789 kPag, temperatures of about 30° C. to about 280° C., $H_2$ to hydrogenatable hydrocarbon mole ratios of about 5:1 to about 0.1:1 and LHSV of about 0.1 to about 20 hr$^{-1}$.

The layered catalysts of this invention can also be used in oxidation reactions. These oxidation reactions include:

1) partial oxidation of hydrocarbon streams, such as naphtha or methane, to generate synthesis gas (CO+ $H_2$);
2) selective oxidation of hydrogen produced from endothermic dehydrogenation reactions such as ethylbenzene to styrene; and,
3) oxidation of methane, ethane or carbon monoxide to clean up flue gas emissions from combustion processes.

The layered sphere catalyst will be of most benefit to processes where the activity or selectivity of the catalyst is limited by intraparticle diffusional resistance of product or reactants.

The conditions for the oxidation process depend on the individual process application but are generally about 350° C. to about 800° C., about 40 kPa to about 2030 kPa, with a diluent present in the feedstream such as $N_2$, $CO_2$, HO to control the reaction. Hydrogen may also be present as a diluent and also a reactant. For the selective oxidation of hydrogen, the molar ratio of oxygen to $H_2$ may vary from about 0.05 to about 0.5. The diluent level is generally from about 0.1 to about 10 moles of diluent per mole of hydrocarbon. For example, the steam to ethylbenzene molar ratio may be from about 5:1 to about 7:1 during the dehydrogenation of ethylbenzene. Typical space velocity for oxidation is between about 0.5 to about 50 hr$^{-1}$ LHSV.

The following examples are presented in illustration of this invention and are not intended as undue limitations on the generally broad scope of the invention as set out in the appended claims.

EXAMPLE 1

Alumina spheres were prepared by the well known oil drop method which is described in U.S. Pat. No. 2,620,314 which is incorporated by reference. This process involves forming an aluminum hydrosol by dissolving aluminum in hydrochloric acid. Hexamethylene tetraamine was added to the sol to gel the sol into spheres when dispersed as droplets into an oil bath maintained at about 93° C. The droplets remained in the oil bath until they set and formed hydrogel spheres. After the spheres were removed from the hot oil, they were pressure aged at 135° C. and washed with dilute ammonium hydroxide solution, dried at 110° C. and calcined at 650° C. for about 2 hours to give gamma alumina spheres. The calcined alumina was now crushed into a fine powder having a particle size of less than 200 microns.

Next, a slurry was prepared by mixing 258 g of an aluminum sol (20 wt. % $Al_2O_3$) and 6.5 g of a 50% aqueous solution of tin chloride and 464 g of deionized water and agitated to uniformly distribute the tin component. To this mixture there were added 272 g of the above prepared alumina powder, and the slurry was ball milled for 2 hours thereby reducing the maximum particle size to less than 40 microns. This slurry (1,000 g) was sprayed onto 1 kg of alpha alumina cores having an average diameter of about 1.05 mm by using a granulating and coating apparatus for 17 minutes to give an outer layer of about 74 microns. At the end of the process, 463 g of slurry were left which did not coat the cores. This layered spherical support was dried at 150° C. for 2 hours and then calcined at 615° C. for 4 hours in order to convert the pseudoboehmite in the outer layer into gamma alumina and convert the tin chloride to tin oxide.

The calcined layered support (1150 g) was impregnated with lithium using a rotary impregnator by contacting the support with an aqueous solution (1:1 solution: support volume ratio) containing lithium nitrate and 2 wt. % nitric acid based on support weight. The impregnated catalyst was heated using the rotary impregnator until no solution remained, dried, and then calcined at 540° C. for 2 hours.

The tin and lithium containing composite was now impregnated with platinum by contacting the above composite with an aqueous solution (1:1 solution: support volume ratio) containing chloroplatinic acid and 1.2 wt. % hydrochloric acid (based on support weight). The impregnated composite was heated using the rotary impregnator until no solution remained, dried and calcined at 540° C. for 2½ hours and reduced in hydrogen at 500° C. for 2 hours. Elemental analysis showed that this catalyst contained 0.093 wt. % platinum, 0.063 wt. % tin and 0.23 wt. % lithium with respect to the entire catalyst. This catalyst was identified as catalyst A. The distribution of the platinum was determined by Electron Probe Micro Analysis (EPMA) using a Scanning Electron Microscope which showed that the platinum was evenly distributed throughout the outer layer only.

EXAMPLE 2

The procedure of Example 1 was repeated, except that a slurry was prepared by mixing 275 g of an alumina sol into 431 g of deionized water with sufficient agitation, and then adding 289 g of gamma alumina powder, 5.36 g of a 50% aqueous solution of tin chloride was used, and after granulation and coating, the layered spherical support had an outer layer of about 99 microns in thickness. There were 248 g of slurry left after the coating was carried out. Elemental analysis (wt. % based on the entire catalyst) showed that this catalyst contained 0.09 wt. % platinum, 0.09 wt. % tin and 0.23 wt. % lithium and was identified as catalyst B. Catalyst B was analyzed by EPMA which showed that the platinum was evenly distributed throughout the outer layer only.

EXAMPLE 3

A catalyst was prepared in a similar way to that of example II of U.S. Pat. No. 4,786,625 except that the solution was sprayed onto the support. The catalyst was analyzed and found to contain 0.43 wt. % platinum, 1.7 wt. % tin and 0.62 wt. % lithium. This catalyst was identified as catalyst C. Catalyst C was analyzed by EPMA which showed that the platinum was on the surface of the support.

EXAMPLE 4

A catalyst was prepared according to example I of U.S. Pat. No. 4,786,625. This catalyst was analyzed and found to contain 0.43 wt. % platinum, 0.48 wt. % tin and 0.58 wt. % lithium. This catalyst was identified as catalyst D. All the metals were evenly distributed throughout the support.

EXAMPLE 5

A gamma alumina slurry (1000g) was prepared as in example 1 except that no tin chloride was added to the slurry. This slurry was applied to 1000 g of alpha alumina cores having a diameter of 1.054 mm as in example 1 and calcined as in example 1 to give a layered support with an outer gamma-alumina layer of 74 microns in thickness.

The layered support (202g) was contacted with an aqueous solution prepared by diluting a 50% tin chloride solution (Sn content: 0.144 g based on metal) and nitric acid (HNO$_3$ content: 18.2g) with deionized water to a volume of 150 ml. The mixture was dried in a rotary evaporator at a temperature of 150° C. for 2 hours, following by calcination at a temperature of 615° C. for 4 hours.

The tin containing layered composition of the previous paragraph was now impregnated with lithium and platinum using a rotary impregnator by contacting the composition with an aqueous solution containing chloroplatinic acid (Pt=0.188g), lithium nitrate (Li=0.54g) and nitric acid. The impregnated catalyst composition was heated in the rotary evaporator until no solution remained, calcined at 540° C. for 2½ hours and then reduced in hydrogen at 500° C. for 2 hours. The platinum and tin were determined by EPMA to be evenly distributed throughout the outer layer. Elemental analysis showed that this layered catalyst composition contained 0.093 wt. % platinum, 0.071 wt. % tin and 0.268 wt. % lithium calculated as the metal and based on the entire catalyst weight. This catalyst was identified as catalyst E.

EXAMPLE 6

A sample of 600 ml. of spherical alumina was prepared as in example 1. This alumina was impregnated using a rotary impregnator with an aqueous solution prepared by diluting 9.55 g of a 50% tin chloride solution and 49.6 g of a 61% nitric acid solution with deionized water to a volume of 420 ml. The impregnated alumina spheres were dried in the rotary evaporator and then calcined at 540° C. for 2½ hours.

The resulting tin-containing catalyst was impregnated with an aqueous solution containing platinum and lithium, prepared by diluting a chloroplatinic acid solution (Pt content: 1.71 g), a lithium nitrate solution (Li content: 1.16 g) and 6.61 g of a 61% nitric acid solution with deionized water to a volume of 420 ml. The obtained spherical catalyst was dried in a rotary evaporator until no solution remained and then calcined at a temperature of 540° C. for 2.5 hours. The platinum and tin were evenly distributed throughout the sphere.

A slurry was prepared by mixing 600 ml of the above spherical catalyst with 4.0 g of P-salt (dinitrodiammineplatinum in nitric acid) 0.641 g of meta stannic acid and 202 g of alumina sol (20 wt. % Al$_2$O$_3$) with 1204 g of deionized water and ball milling the mixture for 4 hours. This slurry was now used to apply a layer onto an alpha-alumina core having a diameter of 1.054 mm as in example 1. A layered catalyst was obtained which had a layer of 50 microns. This layered catalyst composition was dried at 150° C. for 2 hrs. and then calcined at 615° C. for 4 hours to convert the pseudoboehmite in the outer layer to gamma alumina. Finally, the catalyst composition was reduced in hydrogen at 500° C. for 2 hours. Elemental analysis showed that this catalyst contained 0.089 wt. % platinum, 0.113 wt. % tin and 0.05 wt. % lithium, all calculated on an elemental basis and based on the weight of the entire catalyst. This catalyst was identified as catalyst F.

EXAMPLE 7

The catalysts of examples 1–6 were tested for dehydrogenation activity. In a 1.27 cm (½") reactor, 10 cc of catalyst was placed and a hydrocarbon feed composed of 8.8 wt. % n-$C_{10}$, 40.0 wt. % n-$C_{11}$, 38.6 wt. % n-$Cl_{12}$, 10.8 wt. % n-$C_{13}$, 0.8 wt. % n-$C_{14}$ and 1 vol. % non-normals was flowed over the catalyst under a pressure of 138 kPa (20 psig), a $H_2$: hydrocarbon molar ratio of 6:1 and a liquid hourly space velocity (LHSV) of 20 $hr^{-1}$. Water at a concentration of 2000 ppm based on hydrocarbon weight was injected. The total normal olefin concentration in the product (% TNO) was maintained at 15 wt. % by adjusting reactor temperature.

The results of the testing are presented in Table 1. What is presented is the deactivation rate (slope) which is obtained by plotting temperature (° F) needed to maintain 15% TNO versus time. Selectivity for TNO at 120 hours on stream is also presented and is calculated by dividing % TNO by total conversion. Finally, non-TNO selectivity is 100%—% TNO.

TABLE 1

Comparison of Layered versus Non-Layered Catalysts

| Catalyst I.D. | Deactivation Rate(° F./hr) | TNO Selectivity (wt. %) | Non-TNO Selectivity (wt. %) |
| --- | --- | --- | --- |
| A | 0.052 | 94.6 | 5.4 |
| B | 0.032 | 94.0 | 6.0 |
| C | 0.067 | 93.5 | 6.5 |
| D | 0.05 | 91.1 | 8.9 |
| E | 0.050 | 94.4 | 5.6 |
| F | 0.033 | 94.0 | 6.0 |

The results show that the layered catalysts of the invention have both lower deactivation rates and increased selectivity to normal olefins versus catalysts of the prior art. Specifically, comparing catalysts A, B, E and F with catalyst C (platinum on the surface), it is observed that the deactivation rate is smaller for catalysts A, B, E and F. Additionally, selectivity is better for the layered catalysts of the invention. It must be pointed out that when selectivities are this high, one must look at the residual amount left or the non-TNO selectivity. Here, the amount of non-TNO for catalysts A and E are 17 wt. % and 14 wt. % less, respectively, than for catalyst C which is a substantial improvement.

Comparing catalysts A, B, E and F with catalyst D (uniform platinum) what is observed is that catalysts B and F have a much lower deactivation rate than catalyst D, while catalysts A and E have a much higher selectivity (about 39 and 37 wt. % less non-TNO make, respectively) than catalyst D. Again, this shows a marked improvement in stability and selectivity.

EXAMPLE 8

The procedure set forth in example 1 was used to prepare a catalyst with the modification that polyvinyl alcohol (PVA) at a concentration of 2 wt. % of the gamma alumina was added to the slurry. This catalyst was identified as catalyst G.

EXAMPLE 9

The procedure set forth in example 1 was used to prepare a catalyst with the modification that hydroxy propyl cellulose (HPC) at a concentration of 2 wt. % of the gamma alumina was added to the slurry. This catalyst was identified as catalyst H.

EXAMPLE 10

The procedure in example 1 was used to prepare a catalyst with a layer thickness of 90 microns. This catalyst was identified as catalyst 1.

EXAMPLE 11

Catalysts G, H and I were tested for loss of layer material by attrition using the following test.

A sample of the catalyst was placed in a vial which in turn was placed in a blender mill along with two other vials containing the same amount of catalyst sample. The vials were milled for ten (10) minutes, the vials removed and then sieved to separate the powder from the spheres. The powder was weighed and an attrition loss (wt. %) was calculated.

The results of the attrition test are summarized in Table 2.

TABLE 2

Effect of Organic Binding Agent on Attrition

| | Weight Percent Loss | |
| --- | --- | --- |
| Catalyst I.D. | Based on Total Amount | Based On Layer |
| G (PVA) | 1.0 | 4.3 |
| H (HPC) | 1.9 | 8.5 |
| I (No Additive) | 3.7 | 17.9 |

The date is Table 2 show that using an organic binding agent greatly improves the attrition loss of a layered catalyst.

We claim as our invention:

1. A process for preparing a layered catalyst composition comprising an inner core, an outer layer bonded to said inner core, the outer layer bonded to the inner core to the extent that the attrition loss is less than 10 wt. % based on the weight of the outer layer and the outer layer comprising an outer refractory inorganic oxide, having uniformly dispersed thereon at least one platinum group metal and at least one promoter metal, the catalyst composition further having dispersed thereon at least one modifier metal and the inner core and outer refractory inorganic oxide comprised of different materials, the process comprising:
    a) Coating an inner core with a slurry comprising the outer refractory inorganic oxide and an organic bonding agent, said outer refractory inorganic oxide having uniformly dispersed thereon at least one promoter metal, drying the coated core and calcining at a temperature of about 400° C. to about 900° C. for a time sufficient to bond the outer layer to the inner core and provide a layered support;
    b) Uniformly dispersing on the layered support of step (a) a modifier metal and a platinum group metal to give a product, and
    c) Reducing the product of step (b) at reduction conditions to provide the layered catalyst composition.

2. The process of claim 1 where the modifier metal and platinum group metal are dispersed on the layered support by impregnating the support with a solution containing a modifier metal compound and a platinum group metal compound, and calcining the impregnated support at a temperature of about 400° C. to about 700° C.

3. The process of claim 2 where the modifier metal compound is a halide, nitrate or hydroxide compound of the modifier metal.

4. The process of claim 2 where the platinum group metal is platinum and the compound is chloroplatinic acid.

5. The process of claim 1 where the modifier metal and platinum group metal are dispersed on the layered support by:
    a) impregnating the layered support with a solution of a modifier metal compound, drying and then calcining at a temperature of about 200° C. to about 700° C.; and b) impregnating the product of step (a) with a solution of a platinum group metal compound, drying and then calcining at a temperature of about 400° C. to about 700° C. to give the catalyst composition.

6. The process of claim 5 where the modifier metal compound is a halide, nitrate or hydroxide compound of the modifier metal.

7. The process of claim 5 where the platinum group metal is platinum and the compound is chloroplatinic acid.

8. The process of claim 1 where the outer layer has a thickness of about 40 to about 400 micrometers.

9. The process of claim 1 where the inner core is selected from the group consisting of alpha alumina, metals, theta alumina, silicon carbide, cordierite, zirconia, titania and mixtures thereof.

10. The process of claim 1 where the outer refractory inorganic oxide is selected from the group consisting of gamma alumina, delta alumina, theta alumina, silica/alumina, zeolites, non zeolitic molecular sieves, titania, zirconia and mixtures thereof.

11. The process of claim 1 where the promoter metal is selected from the group consisting of tin, germanium, rhenium, gallium, bismuth, lead, indium, cerium, zinc and mixtures thereof.

12. The process of claim 1 where the modifier metal is selected from the group consisting of alkali metals, alkaline earth metals and mixtures thereof.

13. The process of claim 1 where the platinum group metal is selected from the group consisting of platinum, palladium, rhodium, iridium, ruthenium, osmium and mixtures thereof.

14. The product of the process of claim 1.

15. A process for preparing a layered catalyst composition comprising an inner core, an outer layer bonded to said inner core, the outer layer bonded to the inner core to the extent that the attrition loss is less than 10 wt. % based on the weight of the outer layer and the outer layer comprising an outer refractory inorganic oxide, having uniformly dispersed thereon at least one platinum group metal and at least one promoter metal, the catalyst composition further having dispersed thereon at least one modifier metal and the inner core and outer refractory inorganic oxide comprised of different materials, the process comprising:
   a) Uniformly dispersing on the outer refractory inorganic oxide at least one modifier metal, at least one platinum group metal and at least one promoter metal, and
   b) Coating an inner core with a slurry comprising the outer refractory inorganic oxide containing said platinum group metal, promoter metal, modifier metal and an organic bonding agent, drying and then calcining the coated core at a temperature of about 400° C. to about 900° C. thereby providing a layered catalyst composition.

16. The process of claim 15 where the outer layer has a thickness of about 40 to about 400 micrometers.

17. The process of claim 15 where the inner core is selected from the group consisting of alpha alumina, theta alumina, silicon carbide, metals, cordierite, zirconia, titania and mixtures thereof.

18. The process of claim 15 where the outer refractory inorganic oxide is selected from the group consisting of gamma alumina, delta alumina, theta alumina, silica/alumina, zeolites, non zeolitic molecular sieves, titania, zirconia and mixtures thereof.

19. The process of claim 15 where the promoter metal is selected from the group consisting of tin, germanium, rhenium, gallium, bismuth, lead, indium, cerium, zinc and mixtures thereof.

20. The process of claim 15 where the modifier metal is selected from the group consisting of alkali metals, alkaline earth metals and mixtures thereof.

21. The process of claim 15 where the platinum group metal is selected from the group consisting of platinum, palladium, rhodium, iridium, ruthenium and osmium.

22. The product of the process of claim 15.

23. A layered catalyst composition comprising an inner core, an outer layer bonded to said inner core, the outer layer bonded to the inner core to the extent that the attrition loss is less than 10 wt. % based on the weight of the outer layer and, the outer layer comprising an outer refractory inorganic oxide having uniformly dispersed thereon at least one platinum group metal and a promoter metal and the inner core and outer refractory inorganic oxide comprised of different materials, the catalyst composition further having dispersed thereon a modifier metal.

24. The composition of claim 23 where the inner core is selected from the group consisting of alpha alumina, theta alumina, silicon carbide, metals, cordierite, zirconia, titania and mixtures thereof.

25. The composition of claim 23 where the outer refractory inorganic oxide is selected from the group consisting of gamma alumina, delta alumina, eta alumina, theta alumina, silica/alumina, zeolites, nonzeolitic molecular sieves, titania, zirconia and mixtures thereof.

26. The composition of claim 23 where the platinum group metal is selected from the group consisting of platinum, palladium, rhodium, iridium, ruthenium, osmium and mixtures thereof.

27. The composition of claim 23 where the platinum group metal is platinum and is present in an amount from about 0.01 to about 5 wt. % of the catalyst composition.

28. The composition of claim 23 where the promoter metal is selected from the group consisting of tin, germanium, rhenium, gallium, bismuth, lead, indium, cerium, zinc and mixtures thereof.

29. The composition of claim 23 where the modifier metal is selected from the group consisting of alkali metals, alkaline earth metals and mixtures thereof.

30. The composition of claim 23 where the modifier metal is selected from the group consisting of potassium, sodium, lithium, cesium, magnesium and mixtures thereof.

31. The composition of claim 23 where the outer layer has a thickness of about 40 to about 400 microns.

32. The composition of claim 23 further characterized in that it contains a halogen component.

33. The composition of claim 32 where the halogen component is chloride.

* * * * *